United States Patent [19]

Breneman

[11] 4,432,692
[45] Feb. 21, 1984

[54] ARTICLE HANDLING APPARATUS

[75] Inventor: Warren R. Breneman, Colorado Springs, Colo.

[73] Assignee: Woodford Manufacturing Company, Colorado Springs, Colo.

[21] Appl. No.: 315,758

[22] Filed: Oct. 28, 1981

[51] Int. Cl.$^3$ ............................................. B65G 25/00
[52] U.S. Cl. ....................................... 414/749; 74/30; 414/751
[58] Field of Search ................................ 414/750–753, 414/749, 726, 725, 722, 589, 591; 74/30, 33, 71, 76, 78, 89.17, 422, 25

[56] References Cited

U.S. PATENT DOCUMENTS

| 579,559 | 3/1897 | Bossert | 74/71 |
| 1,766,573 | 6/1930 | Westin | 414/733 |
| 4,289,040 | 9/1981 | Haluko, Jr. | 414/749 |

Primary Examiner—Robert J. Spar
Assistant Examiner—Donald W. Underwood
Attorney, Agent, or Firm—Zarley, McKee, Thomte, Voorhees & Sease

[57] ABSTRACT

An article handling apparatus includes a guide block which is supported on a base frame with freedom of movement in two dimensions. An article gripping attachment is mounted on the guide block which is further provided with a cam slot for defining the intended path of movement for the gripping attachment. A drive shaft, rotatably supported at a fixed position on the base frame, has a cam follower engaged within the cam slot and coacting drive means are provided for moving the guide block relative to the cam follower. A coacting rack and pinion gear on the guide block and drive shaft respectively, are operative for moving the guide block along the path defined by the cam slot. The drive shaft may be rotated by a combination slider crank mechanism and rack and pinion arrangement for producing a harmonic motion of the gripping attachment.

11 Claims, 9 Drawing Figures

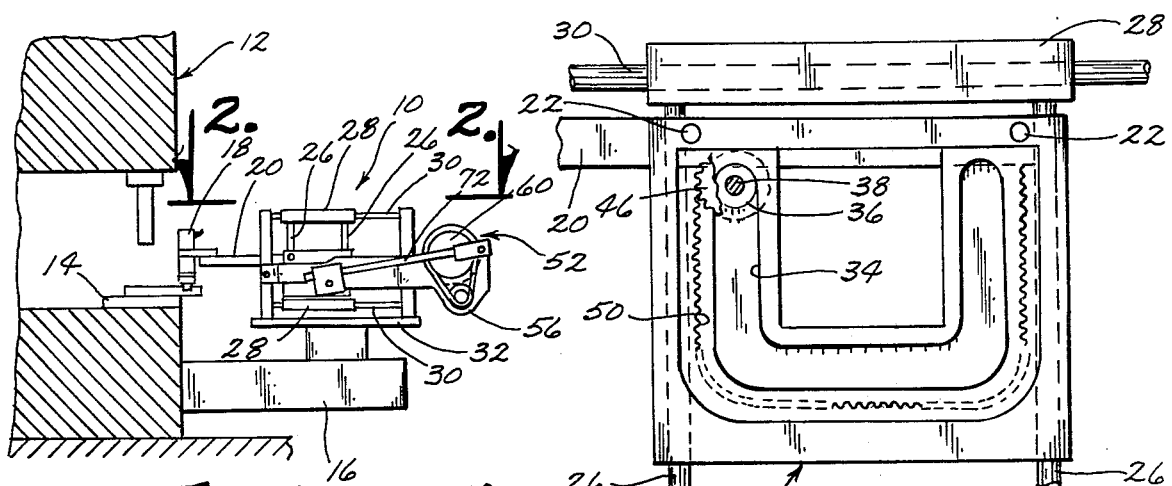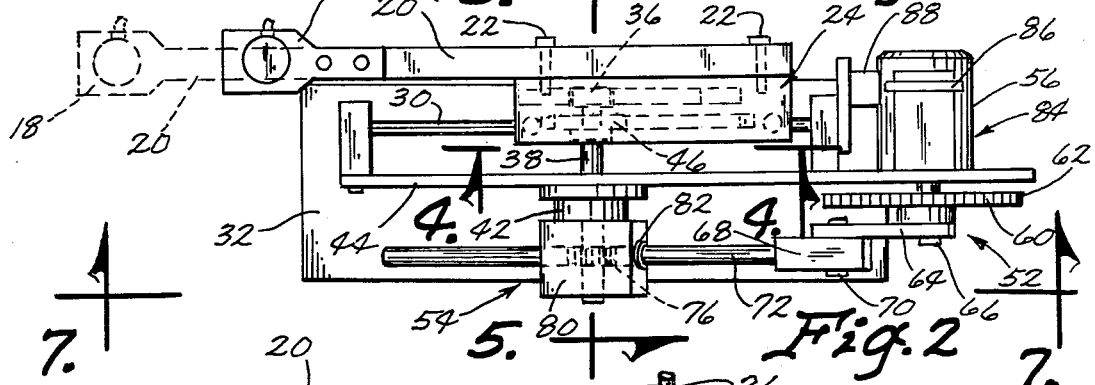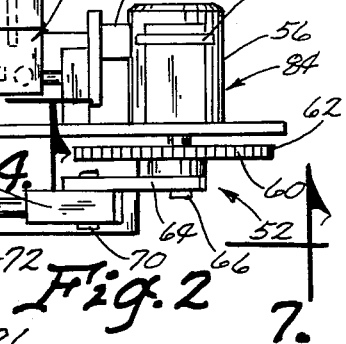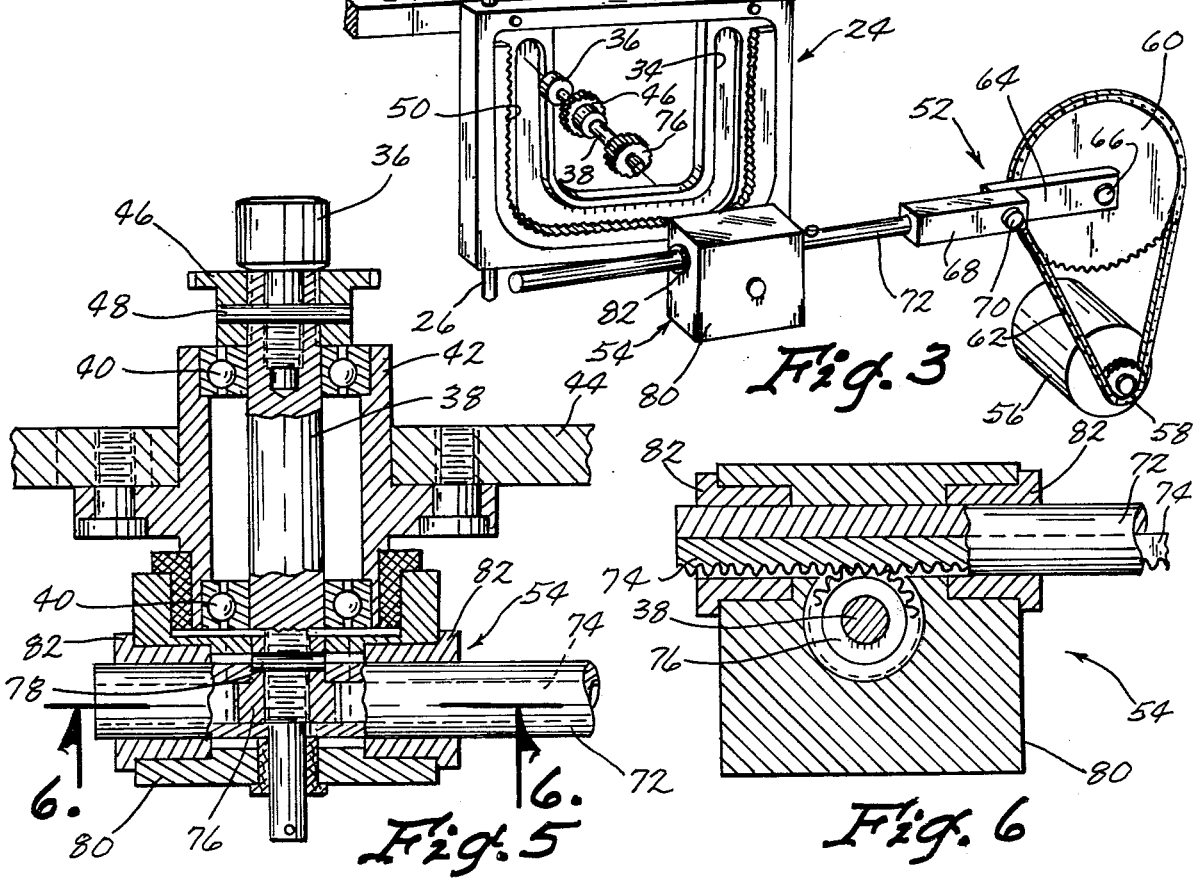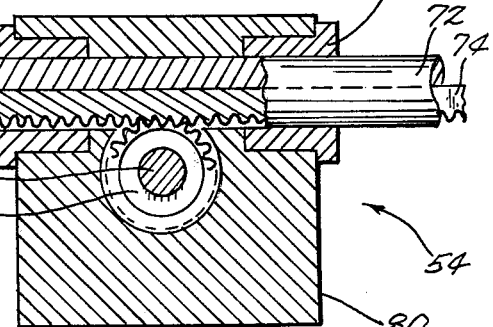

ARTICLE HANDLING APPARATUS

BACKGROUND OF THE INVENTION

The present invention is directed generally to an apparatus for moving an article supporting device along a predetermined path and more particularly to a mechanical apparatus for picking up, moving and releasing an article in a predictable and consistent operation.

Article handling machinery have become increasingly popular in recent years, for example in manufacturing operations for picking up and properly positioning a workpiece at the work station of a machine for a particular operation. Existing workpiece handling apparatus have generally had their motion produced either by barrel cams or air cylinders.

Whereas barrel cams driven by a motor and clutch-brake unit produce a predictable and predetermined motion, they incorporate so many cam followers and levers with pivot points that an out-of-tolerance condition can develop in an undesirably short time span. Air cylinder driven units, on the other hand, produce a non-predictable motion. The control of motion is attempted by the use of flow control and cushioning devices which inherently cause a change in motion due to the nature of compressed air and its contaminants.

Accordingly, it is a primary object of the present invention to provide an improved article handling apparatus.

Another object is to provide an article handling apparatus which produces a precise consistent movement.

Another object is to provide an article handling apparatus which is of a relatively simple trouble-free mechanical construction.

A more specific object of the invention is to provide an article handling apparatus which produces a harmonic motion which accelerates and decelerates between zero velocity points coinciding with the pickup and release of an object.

Finally, it is a further object to provide an article handling apparatus which is durable in construction, economical to manufacture and easy to maintain.

SUMMARY OF THE INVENTION

The article handling apparatus of the present invention includes a guide block which is supported on a base frame with freedom of up and down and back and forth movement. An article gripping attachment is mounted on the guide block which is further provided with a cam slot for defining the intended path of movement for the gripping attachment. A drive shaft, rotatably supported at a fixed position on the base frame, has a cam follower engaged within the cam slot and coacting drive means are provided for moving the guide block relative to the cam follower.

A preferred drive means includes a pinion gear fixed on the drive shaft and a coacting elongated gear rack fixed on the guide block and having a contour and position for operative engagement with the pinion gear at all positions of the guide block.

The drive shaft may be run directly from an electric motor by a simple roller chain and sprocket combination or a slider crank mechanism employing a rack and pinion arrangement may be interposed between the motor and drive shaft for producing a harmonic motion of the gripping attachment.

Since the article handling apparatus of the present invention is purely mechanical, it can be depended upon to produce a predictable and consistent motion throughout the life of the machine.

DESCRIPTION OF THE DRAWINGS

FIG. 1 is a diagrammatic elevational view of the article handling apparatus in operative association with a manufacturing machine;

FIG. 2 is an enlarged top view of the article handling apparatus, as seen along line 2—2 in FIG. 1;

FIG. 3 is a partially exploded perspective view of the motion producing elements of the invention;

FIG. 4 is an enlarged detail elevational view of the guide block of the invention;

FIG. 5 is an enlarged top sectional view of the drive shaft and associated gears and cam follower;

FIG. 6 is an enlarged detail sectional view of the rack and pinion gears, as seen on line 6—6 in FIG. 5;

DESCRIPTION OF THE PREFERRED EMBODIMENT

Figure 7:
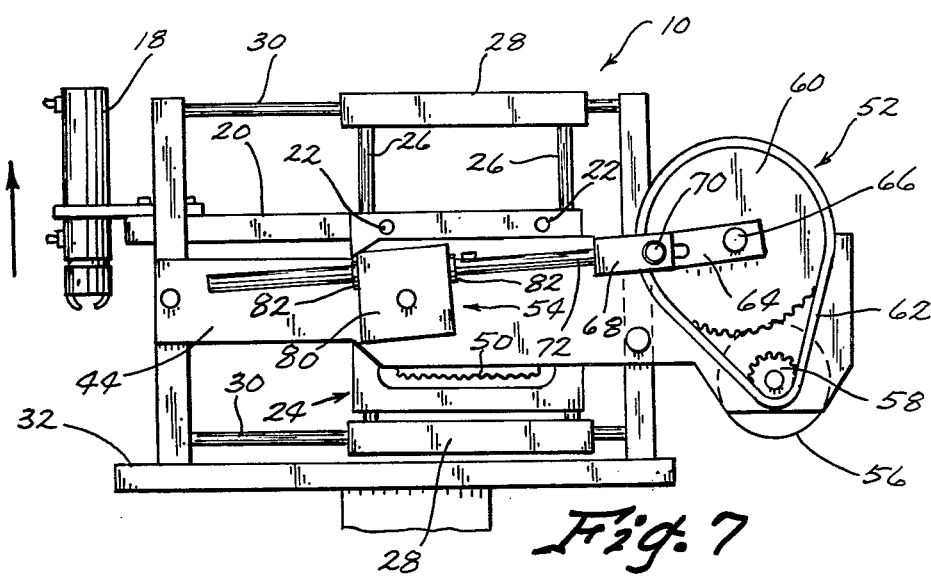
FIG. 7 is a side elevational view of the apparatus showing the gripping attachment at a home position with the unit at rest.

The article handling apparatus 10 of the present invention is shown in FIG. 1 in operative association with an index type production machine 12 adapted to perform an operation on a workpiece 14. The apparatus 10 is supported on a fixed extension 16 for picking up the workpiece 14, properly placing it in the machine 12, returning to its home position picking up another workpiece 14 and await the next cycle of machine 12.

The workpiece 14 is grasped by a gripping attachment 18, many types of which are commercially available from various sources. Attachment 18 is supported on the end of a gripper attachment arm 20 which is secured at its opposite end by bolts 22 to a generally rectangular guide block 24 (FIGS. 3 and 4).

Guide block 24 is supported for up and down sliding movement on a pair of spaced-apart vertical guide rods 26 which are fixed at their opposite ends in slide members 28 which in turn, are horizontally slidable on vertically spaced-apart horizontal guide rods 30. The horizontal guide rods 30 are stationarily fixed on a base frame indicated generally at 32.

The guide block 24 is further provided with a generally U-shaped cam slot 34 in one face thereof for defining the path of movement of the guide block 24. In FIGS. 2, 3 and 5, it is seen that a cam follower 36, which is mounted on the end of a drive shaft 38, is operatively engaged within the cam slot 34. Drive shaft 38 is rotatably supported by ball bearings 40 carried in a bearing block 42 which is fixed to a stationary plate 44 of base frame 32.

A pinion gear 46 is fixed onto drive shaft 38 by a roll pin 48 (FIG. 5) between the cam follower 36 and bearing block 42. It can be seen in FIGS. 2-4 that the pinion gear 46 is disposed in operative engagement with a gear rack 50 which is fixed to the guide block 24. The gear rack 50 extends in adjacent uniformly spaced relation along the cam slot 34 for continuous engagement of the pinion gear 46 with the gear rack 50 at all positions of the guide block 24 relative to the cam follower 36. As a result, the guide block 24 and gripping attachment 18 are moved along a path defined by the cam slot 24 in response to rotation of drive shaft 38.

The preferred means for rotating drive shaft 38 is the combination slider crank mechanism 52 and rack and pinion gear arrangement 54 as shown in FIGS. 3, 5 and 6. Rotation originates from a synchronous electric motor 56 which rotates a small sprocket 58 for driving a large sprocket 60 by chain 62. A crank 64 is fixed to the large sprocket shaft 66 for rotation therewith. A crank arm 68 is pivotally connected to the outer end of crank 64 by a pin 70. The free end of crank arm 68 is in the form of an elongated rod 72 having a rack gear 74 formed on the underside thereof. Rack gear 74 engages a drive pinion 76 which is fixed on drive shaft 38 by a roll pin 78 as shown in FIG. 5. The rack and pinion gears 74 and 76 are supported in engagement within a housing 80 pivotally supported on drive shaft 38. It is seen in FIG. 6 that rod 72 is slidably supported relative to the housing within bearings 82.

It can be seen in FIGS. 1 and 2 that the electric motor 56 is fixed onto base frame plate 44 and that the large sprocket shaft 66 is likewise rotatably supported in a suitable bearing block structure 84 on plate 44. Structure 84 additionally carries rotatable magnets 86 which operate a reed switch 88 for automatically controlling the actuation of electric motor 56 by circuitry not shown. Similarly, the same circuitry automatically controls the operation of the fluid actuated gripping attachment 18 for picking up and releasing an article.

Figure 8:
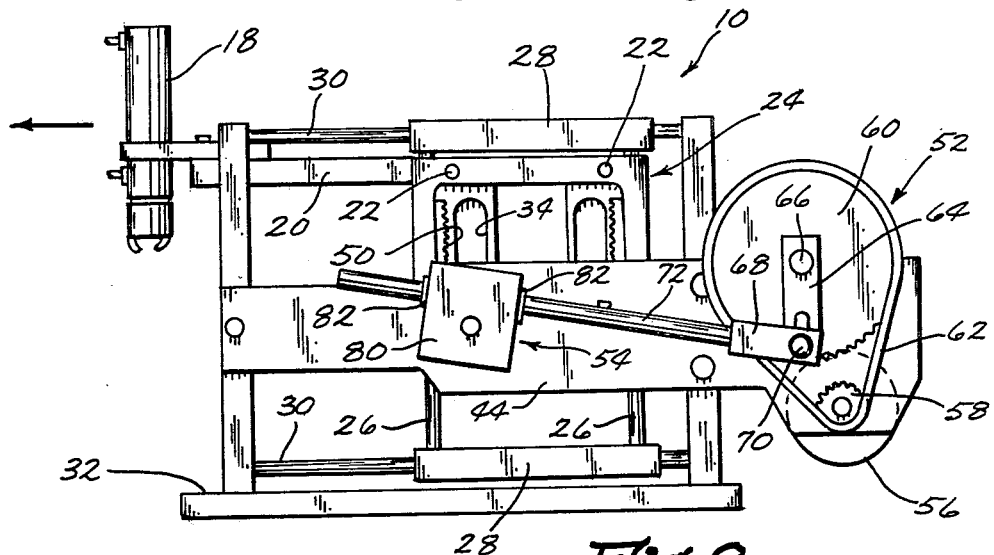
FIG. 8 is a side elevational view of the apparatus showing the crank at a one-quarter turn position.
Figure 9:
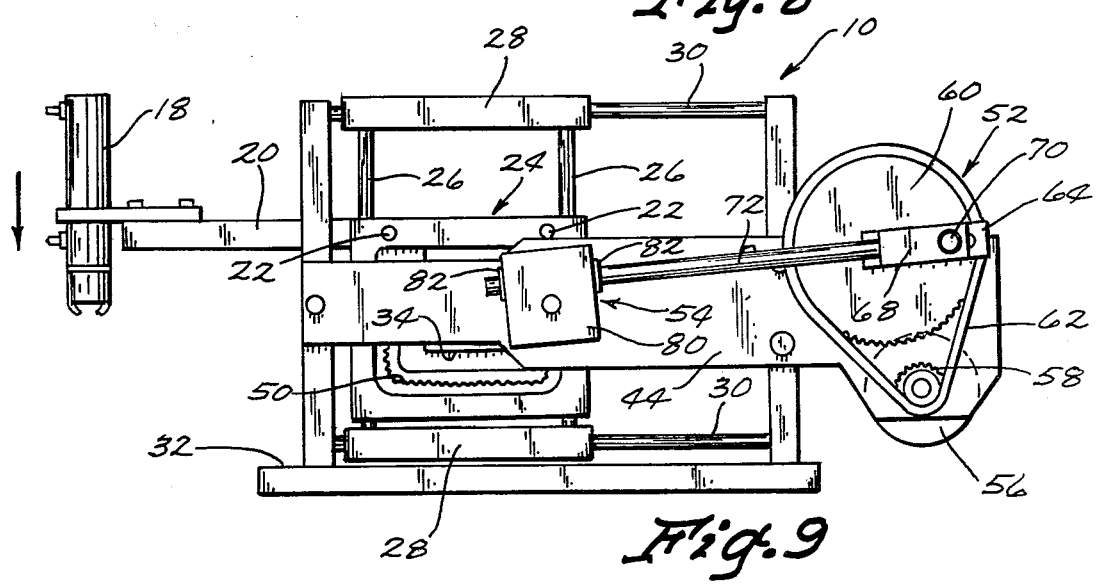
FIG. 9 is an elevational view of the apparatus showing the crank at a one-half turn position.

The operation of the article handling apparatus 10 can be seen with reference to FIGS. 7–9. In FIG. 7, the unit is shown at rest with the gripping attachment 18 in a rearward lowered home position. Movement is initiated by counterclockwise rotation of electric motor sprocket 58 which rotates crank 64 through a quarter revolution to the position of FIG. 8. This downward and rearward movement of crank 64 draws the crank arm 68 rearwardly through housing 80 causing clockwise rotation of drive shaft 38 and thereby upward vertical movement of guide block 24 by pinion gear 46.

In response to continued rotation of crank 64 to the one-half turn position of FIG. 9, the guide block 24 and gripping attachment 18 are moved forwardly as indicated by arrow 90 in FIG. 8 and downwardly as indicated by arrow 92 in FIG. 9 whereupon a workpiece supported in the gripping attachment is released at the work station of a machine, for example.

Continued rotation of the motor after release of the workpiece continues the counter-clockwise rotation of crank 64. Since it is evident in FIG. 9 that the crank has been rotated past the over center position with respect to the crank arm 68, continued counterclockwise rotation pushes the crank arm forwardly thereby reversing the rotation of pinion gear 46 to again raise guide block 24, draw it rearwardly and lower it back to the home position of FIG. 7. Thus a complete cycle of movement of the gripping attachment 18 is accomplished in response to each revolution of the crank 64.

The motion afforded by the slider crank mechanism 52 is harmonic. Its motion accelerates and decelerates between stop positions at opposite ends of its path of movement. This produces a motion of the gripping device 18 that accelerates from zero velocity to a maximum velocity and then decelerates to zero velocity again. This sequence of motion is produced twice for completion of each cycle of the machine. The zero velocity points of the cycle coincide with the pickup point and the release point of an object.

Whereas a preferred form of the invention has been disclosed herein, it will be appreciated that various alterations, modifications and additions may be made which are within the intended broad scope of the appended claims. For example, the slider crank mechanism 52 and rack and pinion gear arrangement 54 may be replaced with a simple direct chain drive from a reversible electric motor to the drive shaft 38. Whereas cam slot 34 has a generally U-shaped configuration, it will be appreciated that an infinite number of cam slot shapes are possible for producing a corresponding infinite variety of movements for the gripping attachment 18. It will be seen that the actual path of movement of the gripping attachment 18 is an inverted mirror image of the cam slot. It is furthermore contemplated that for certain cam slot configurations, movement of the guide block may be achieved by the coacting cam follower and cam slot alone without the associated rack and pinion gears.

Thus there has been shown and described an article handling apparatus which accomplishes at least all of its stated objects.

I claim:

1. An article handling apparatus comprising,
   a base frame,
   a guide member,
   means for supporting said guide member on the base frame with freedom of at least limited two-dimensional movements,
   an article support means mounted on said guide member for movement therewith,
   said guide member including an elongated cam slot,
   a drive shaft having a cam follower supported thereon,
   means for rotatably supporting said drive shaft on said base frame at a position such that said cam follower is positioned within said cam slot,
   coacting drive means on said guide member and drive shaft operative, in response to rotation of said drive shaft, to produce translation of said guide member and article support means along a path defined by said cam slot, and
   said coacting drive means comprising a pinion gear fixed on said drive shaft and a coacting elongated gear rack connected to said guide block and having a contour and position for operative engagement with said pinion gear at all positions of said guide member.

2. The article handling apparatus of claim 1 wherein said cam slot and gear rack are arranged in a U-shaped configuration.

3. The article handling apparatus of claim 1 wherein said guide member is vertically disposed and supported with freedom of sliding movement in vertical and horizontal directions in a vertical plane.

4. The article handling apparatus of claim 1 further comprising means for rotating said drive shaft.

5. An article handling apparatus comprising,
   a base frame,
   a guide member,
   means for supporting said guide member on the base frame with freedom of at least limited two-dimensional movements,
   an article support means mounted on said guide member for movement therewith,
   said guide member including an elongated cam slot,
   a drive shaft having a cam follower supported thereon, means for rotatably supporting said drive shaft on said base frame at a position such that said cam follower is positioned within said cam slot, coacting drive means on said guide member and drive shaft operative, in response to rotation of said drive shaft, to produce translation of said guide member and article support means along a path defined by said cam slot, and means for rotating said drive shaft comprising a pinion gear fixed on said drive shaft, an elongated crank arm having a rack gear thereon, means for slidably supporting said crank arm with said rack and pinion gears in operative engagement, a rotatable crank supported on said base frame and means for pivotally connecting said crank to said crank arm for back-and-forth movement of said rack gear in response to each complete rotation of said crank.

6. The article handling apparatus of claim 5 further comprising power means for rotating said crank.

7. The article handling apparatus of claim 1 further comprising an article support arm secured to said guide block and extended outwardly therefrom, said article support means being mounted on said article support arm in spaced relation from said guide block.

8. The article handling apparatus of claim 1 wherein said article support means comprises a fluid actuated gripping means.

9. The article handling apparatus of claim 1 wherein said cam follower is concentrically mounted on one end of said drive shaft.

10. An article handling apparatus, comprising
a base frame,
a guide block,
means for supporting the guide block on the base frame with freedom of up and down and back and forth movement,
a gripper attachment arm connected to the guide block and extended outwardly therefrom,
a gripping attachment mounted on said gripper attachment arm in spaced relation from said guide block,
said guide block having an elongated nonlinear cam slot therein,
a drive shaft having a cam follower supported thereon,
means for rotatably supporting said drive shaft on said base frame at a position with said cam follower engaged within said cam slot whereby said guide block and gripping attachment are constructed to a path of movement defined by said cam slot, and
coacting drive means for moving said guide block relative to the base frame, comprising a pinion gear fixed on the drive shaft and a coacting elongated gear rack fixed on the guide block and arranged relative to said cam slot for continuous operative engagement with said pinion gear throughout the path of movement of said guide block and gripping attachment.

11. The article handling apparatus of claim 10 wherein said means for rotating said drive shaft comprises a pinion gear fixed on said drive shaft, an elongated crank arm having a rack gear thereon, means for slidably supporting said crank arm with said rack and pinion gears in operative engagement, a rotatable crank supported on said base frame and means for pivotally connecting said crank to said crank arm for back and forth movement of said rack gear in response to each complete rotation of said crank.

* * * * *